United States Patent

Mandai et al.

[11] Patent Number: 5,901,549
[45] Date of Patent: May 11, 1999

[54] PILOT BURNER FUEL NOZZLE WITH UNEVEN FUEL INJECTION FOR PREMIXED TYPE COMBUSTOR PRODUCING LONG AND SHORT FLAMES

[75] Inventors: Shigemi Mandai; Hiroyuki Nishida; Satoshi Tanimura; Jun Kubota, all of Hyogo-ken, Japan

[73] Assignee: Mitsubishi Heavy Industries, Ltd., Tokyo, Japan

[21] Appl. No.: 08/846,594

[22] Filed: Apr. 30, 1997

[51] Int. Cl.⁶ .................................. F02C 7/62; F02C 3/00
[52] U.S. Cl. ............................ 60/39.06; 60/737; 60/746; 60/742
[58] Field of Search .................. 60/39.06, 737, 60/738, 740, 742, 746, 747; 431/278, 283, 285

[56] References Cited

U.S. PATENT DOCUMENTS

| | | | |
|---|---|---|---|
| 3,306,333 | 2/1967 | Mock | 60/746 |
| 3,763,650 | 10/1973 | Hussey et al. | 60/737 |
| 4,850,194 | 7/1989 | Fuglistaller et al. | 60/737 |
| 5,121,597 | 6/1992 | Urushidani et al. | 60/740 |
| 5,373,694 | 12/1994 | Clark | 60/740 |
| 5,410,884 | 5/1995 | Fukue et al. | 60/747 |
| 5,437,159 | 8/1995 | Ansart et al. | 60/746 |
| 5,450,725 | 9/1995 | Takahara et al. | 60/737 |
| 5,452,857 | 9/1995 | Furuse et al. | 239/405 |

*Primary Examiner*—Timothy S. Thorpe
*Assistant Examiner*—Teo Kim
*Attorney, Agent, or Firm*—Alston & Bird LLP

[57] ABSTRACT

In a pilot burner fuel nozzle for a premixed type combustor, diffusion pilot fuel injection ports (fuel holes 101) are disposed unevenly in the circumferential direction, whereby a nonuniform pilot flame is formed in the circumferential direction in the premixed type combustor. Thereupon, the heat is distributed in the axial direction, so that oscillated combustion does not occur, by which stable combustion can be maintained.

11 Claims, 2 Drawing Sheets

PILOT BURNER FUEL NOZZLE WITH UNEVEN FUEL INJECTION FOR PREMIXED TYPE COMBUSTOR PRODUCING LONG AND SHORT FLAMES

FIELD OF INVENTION AND RELATED ART STATEMENT

The present invention relates to a pilot burner fuel nozzle for a premixed type combustor used for a gas turbine etc.

FIG. 3 shows a conventional premixed type low-NOx combustor for a gas turbine. In a premixed type combustor 401, fuel supplied from a main nozzle 404 is mixed with air, forming a premixed gas in the combustor 401. The premixed gas is burned together with pilot fuel supplied from a pilot burner fuel nozzle (hereinafter referred to as a pilot nozzle) 403 provided inside a cone 405 arranged at the central portion of the combustor 401. Reference numeral 402 denotes a wall surface cooling structural member.

FIGS. 4a and 4b show respectively an example of a conventional pilot burner used for the aforesaid premixed type low-NOx combustor 401. At the downstream end (tip end) of the pilot nozzle body 301 of the pilot burner, fuel holes 302 are formed evenly in the circumferential direction. Fuel gas is supplied from the fuel holes 302 as a pilot fuel.

For the conventional pilot nozzle 301 of the premixed type low-NOx combustor 401, small holes are formed evenly in the circumferential direction, and pilot fuel is supplied from the small holes, so that combustion is started at the time when the premixed gas surrounding the small holes comes into contact with the pilot flame, and uniform short flame is formed in the circumferential direction. Therefore, the heat rate in the axial direction is high, so that oscillated combustion is liable to occur.

OBJECT AND SUMMARY OF THE INVENTION

An object of the present invention is to provide a pilot burner fuel nozzle for a premixed type combustor, which can solve the above problem.

The pilot burner fuel nozzle for a premixed type combustor in accordance with the present invention takes following measures:

(1) A plurality of diffusion pilot fuel injection ports are disposed unevenly in the circumferential direction.
(2) A plurality of premixing fuel injection ports are disposed unevenly in the circumferential direction on the upstream side of diffusion pilot fuel injection ports.

In the above mode (1) of the present invention, a pilot flame is produced as a kindling source nonuniformly in the circumferential direction by the fuel supplied from the diffusion pilot fuel injection ports disposed unevenly in the circumferential direction of the pilot burner fuel nozzle. The premixed gas supplied from main nozzles which lie in a region where the pilot flame is present burns with a short flame. On the other hand, the premixed gas supplied from main nozzles which lie in a region where the pilot flame is absent burns with a long flame by the flame propagation from the premixed flame burning with a short flame. Thereupon, the heat is distributed in the axial direction, so that oscillated combustion does not occur, by which stable combustion can be maintained.

In the above mode (2) of the present invention, the premixed gas supplied from the plural premixing fuel injection ports on the upstream side burns with the flame formed by the burning of the fuel supplied from the diffusion pilot fuel injection ports on the downstream side being used as a kindling source, so that a pilot flame is formed. Since the plural premixing fuel injection ports on the upstream side are disposed unevenly in the circumferential direction, the pilot flame is formed nonuniformly in the circumferential direction. Thereupon, the heat is distributed in the axial direction, so that oscillated combustion does not occur, by which stable combustion can be maintained.

BRIEF DESCRIPTION OF THE DRAWINGS

FIG. 1a is a longitudinal sectional view thereof, and FIG. 1b is a side view thereof;

FIG. 2a is a longitudinal sectional view thereof, FIG. 2b is a side sectional view of a portion of premixing pilot holes thereof, and FIG. 2c is a side view thereof;

FIG. 4a is a longitudinal sectional view thereof, and FIG. 4b is a side view thereof.

DETAILED DESCRIPTION OF PREFERRED EMBODIMENTS

Figure 1A:
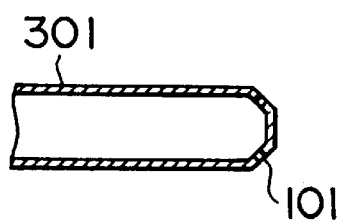
FIGS. 1a and 1b show respectively a first embodiment of a pilot burner fuel nozzle in accordance with the present invention.
Figure 1B:
Figure 4A:
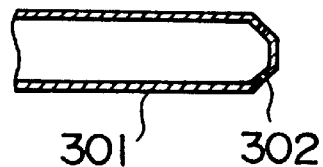
FIGS. 4a and 4b show respectively a conventional pilot burner fuel nozzle.
Figure 4B:
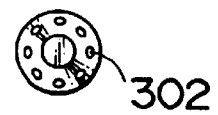

A first embodiment of the present invention will be described with reference to FIGS. 1a and 1b. The same reference numerals are applied to elements having the same function as that of the element shown in FIGS. 4a and 4b. This embodiment relates to a pilot burner fuel nozzle (hereinafter referred to as a pilot nozzle) used for the premixed type low-NOx combustor for a gas turbine shown in FIGS. 4a and 4b. At the downstream end of the pilot nozzle body 301, a plurality of fuel holes 101 are formed as diffusion pilot fuel injection ports unevenly, for example, at unequally spaced intervals partially, in the circumferential direction.

In this embodiment, by burning fuel supplied from the fuel holes 101 formed unevenly in the circumferential direction, a pilot flame is formed nonuniformly as a kindling source. The premixed gas supplied from main nozzles which lie in a region where the pilot flame is present burns with a short flame. On the other hand, the premixed gas supplied from main nozzles which lie in a region where the pilot flame is absent burns with a long flame by the flame propagation from the premixed flame burning with a short flame.

Thereupon, the heat is distributed in the axial direction, so that oscillated combustion does not occur, by which stable combustion can be maintained.

Figure 2A:
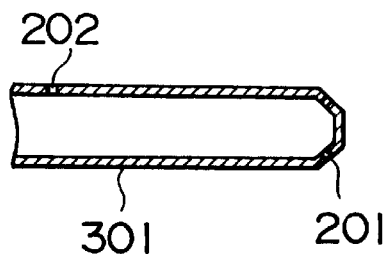
FIGS. 2a, 2b and 2c show respectively a second embodiment of a pilot burner fuel nozzle in accordance with the present invention.
Figure 2B:
Figure 2C:
Figure 3:
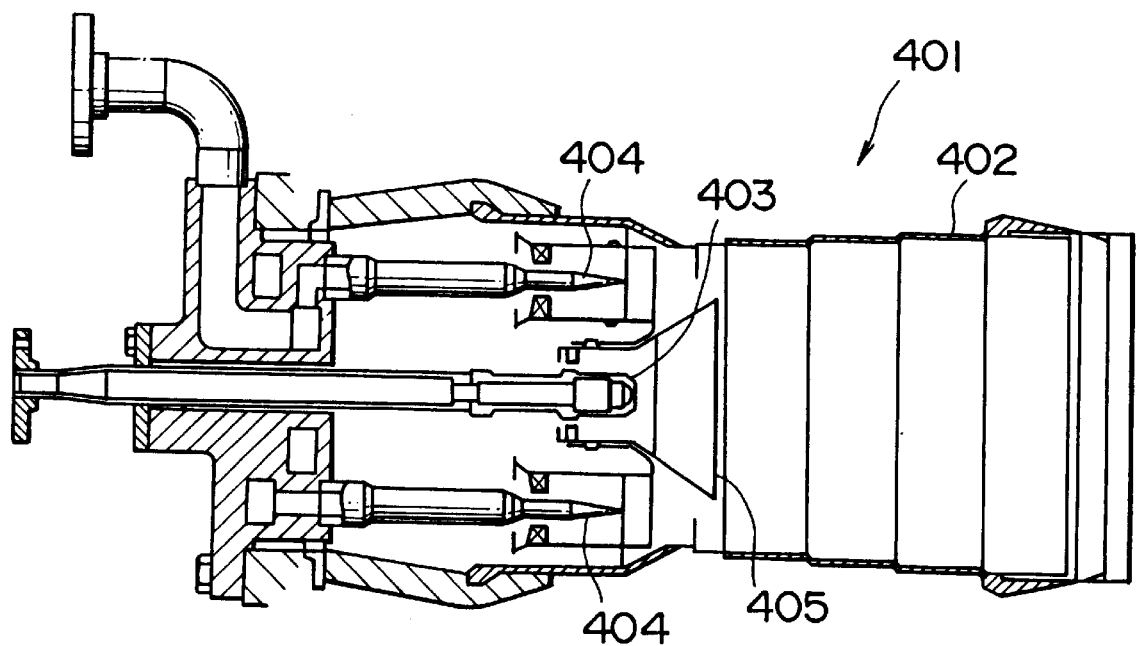
FIG. 3 is a longitudinal sectional view of a conventional premixed type low-NOx combustor for a gas turbine.

A second embodiment of the present invention will be described with reference to FIGS. 2a and 2b. This embodiment also relates to a pilot burner fuel nozzle used for the premixed type low-NOx combustor for a gas turbine shown in FIGS. 4a and 4b. At the downstream end of the pilot nozzle body 301, a plurality (eight) of diffusion flame pilot holes 201 are formed as diffusion pilot fuel injection ports at equally spaced intervals in the circumferential direction. Also, at the upstream portion of the pilot nozzle body 301, three premixing pilot holes 202 are formed as premixing fuel injection holes unevenly, that is, at unequally spaced intervals in the circumferential direction.

In this embodiment, fuel supplied from the diffusion flame pilot holes 201 burns to form a flame as a kindling source, and premixed gas supplied from the premixing pilot holes 202 burns to form a pilot flame. Since the premixing pilot holes 202 are disposed unevenly in the circumferential direction, the concentration of fuel from the premixing pilot holes 202 is nonuniform in the circumferential direction, so that the pilot flame is formed nonuniformly in the circumferential direction.

Thereupon, the heat is distributed in the axial direction, so that oscillated combustion does not occur, by which stable combustion can be maintained.

In the above second embodiment, three premixing pilot holes 202 are formed. However, according to an experiment performed by the inventor, it was found that the number of the premixing pilot holes 202 should preferably be four or less.

As described above, in the present invention, heat is distributed by forming a nonuniform pilot flame in the circumferential direction, whereby oscillated combustion does not occur, so that stable combustion can be maintained.

We claim:

1. A premixed type combustor, comprising:

a combustor chamber;

an elongate pilot fuel nozzle within said combustor chamber; and a plurality of main fuel nozzles arranged peripherally with respect to said pilot fuel nozzle and operative to form a premixed gas within said combustor chamber, said elongate pilot fuel nozzle having a plurality of fuel injection ports unevenly spaced circumferentially around the elongate axis of said pilot fuel nozzle so that said pilot fuel nozzle is operative to provide a pilot flame that is unevenly circumferentially arranged around said elongate axis so that said pilot flame causes a first portion of said premixed gas in a first region of said combustor chamber to burn with a short flame and a second portion of said premixed gas in a second region of said combustor chamber to burn with a long flame, whereby heat is distributed in the direction of said elongate axis to diminish oscillated combustion.

2. The premixed type combustor of claim 1, wherein said uneven circumferential spacing of said fuel injection ports around said elongate axis is operative so that said pilot flame is present in said first region and absent in said second region, so that said long flame is established by flame propagation from said short flame.

3. The premixed type combustor of claim 1, further comprising a cone within said combustor chamber, wherein said pilot fuel nozzle is positioned within said cone and said main fuel nozzles are external of said cone and arranged peripherally with respect to said cone.

4. The premixed type combustor of claim 1, wherein:

said pilot fuel nozzle comprises a downstream end within said combustor chamber;

said fuel injection ports are positioned upstream of said downstream end; and said pilot fuel nozzle further comprises a downstream group of fuel injection ports that are proximate to said downstream end and displaced along said elongate axis from said upstream group of pilot fuel injection ports.

5. The premixed type combustor of claim 4, wherein said downstream group of fuel injection ports is evenly angularly arranged around said elongate axis.

6. A premixed type combustor, comprising:

a combustor chamber;

an elongate pilot fuel nozzle within said combustor chamber; and a plurality of main fuel nozzles arranged peripherally with respect to said pilot fuel nozzle and operative to form a premixed gas within said combustor chamber, said elongate pilot fuel nozzle having a plurality of fuel injection ports defining an uneven circumferential spacing around the elongate axis of said pilot fuel nozzle so that said pilot fuel nozzle is operative to provide a pilot flame that is unevenly circumferentially arranged around said elongate axis so that said pilot flame causes a first portion of said premixed gas in a first region of said combustor chamber to burn with a short flame and a second portion of said premixed gas in a second region of said combustor chamber to burn with a long flame, whereby heat is distributed in the direction of said elongate axis to diminish oscillated combustion, and wherein said plurality of fuel injection ports comprises an upstream group of fuel injection ports and a group of downstream fuel injection ports that are downstream from said upstream fuel injection ports, and said upstream fuel injection ports define said uneven circumferential spacing.

7. The premixed type combustor of claim 6, wherein said uneven circumferential spacing is operative to provide that said pilot flame is present in said first region and absent in said second region, so that said long flame is established by flame propagation from said short flame.

8. The premixed type combustor of claim 6, further comprising a cone within said combustor chamber, wherein said pilot fuel nozzle is within said cone and said main fuel nozzles are external of said cone and arranged peripherally with respect to said cone.

9. The premixed type combustor of claim 6, wherein said downstream fuel injection ports are evenly circumferentially spaced around said elongate axis.

10. A method of combusting in a premixed type combustor chamber, comprising the steps of:

forming a premixed gas within the combustor chamber; and providing a pilot flame from an elongate pilot fuel nozzle within the combustor chamber so that the pilot flame is unevenly circumferentially arranged around the elongate axis of the pilot fuel nozzle and so that the pilot flame causes a first portion of the premixed gas in a first region of the combustor chamber to burn with a short flame and a second portion of the premixed gas in a second region of the combustor chamber to burn with a long flame, so that heat is distributed in the direction of the elongate axis and oscillated combustion is diminished.

11. The method of claim 10, wherein the pilot flame is present in the first region and is not present in the second region, so that the long flame is established by flame propagation from the short flame.

* * * * *